United States Patent [19]

Woidke et al.

[11] 4,048,861

[45] Sept. 20, 1977

[54] DEVICE FOR OSCILLATING A ROTATING BODY ALONG ITS ROTATIONAL AXIS

[75] Inventors: Richard Paul Woidke; Thomas Joseph Wester, both of Toledo; Eric Joseph Brosch, Grand Rapids, all of Ohio

[73] Assignee: Johns-Manville Corporation, Denver, Colo.

[21] Appl. No.: 654,319

[22] Filed: Feb. 2, 1976

[51] Int. Cl.[2] .......................................... F16H 25/12
[52] U.S. Cl. ...................................... 74/56; 226/179;
226/192; 226/194; 242/158 R; 242/158.5
[58] Field of Search ............... 226/179, 194, 192;
74/25, 56; 242/158.5, 158 R; 28/1 CL;
101/349; 83/347

[56] References Cited

U.S. PATENT DOCUMENTS

| 2,500,812 | 3/1950 | Frederick | 74/56 X |
|---|---|---|---|
| 3,348,480 | 10/1967 | Bohac et al. | 74/56 X |
| 3,387,634 | 6/1968 | Hilsenberg | 242/158.5 X |
| 3,815,461 | 6/1974 | Genson | 83/347 |

Primary Examiner—Bruce H. Stoner, Jr.
Attorney, Agent, or Firm—Robert M. Krone; Joseph J. Kelly; Stephen C. Shear

[57] ABSTRACT

A rotating body, such as a pulley or a guide wheel, is oscillatable along its rotational axis. The rotating body is carried by a longitudinal support having a cam surface extending generally perpendicular to the rotational axis. The support is mounted for rotation with a supporting shaft and is biased along the rotational axis so that the cam surface engages a stationary cam follower. Rotation of the shaft, support, and body relative to the cam follower results in the oscillation of the rotatable body.

2 Claims, 9 Drawing Figures

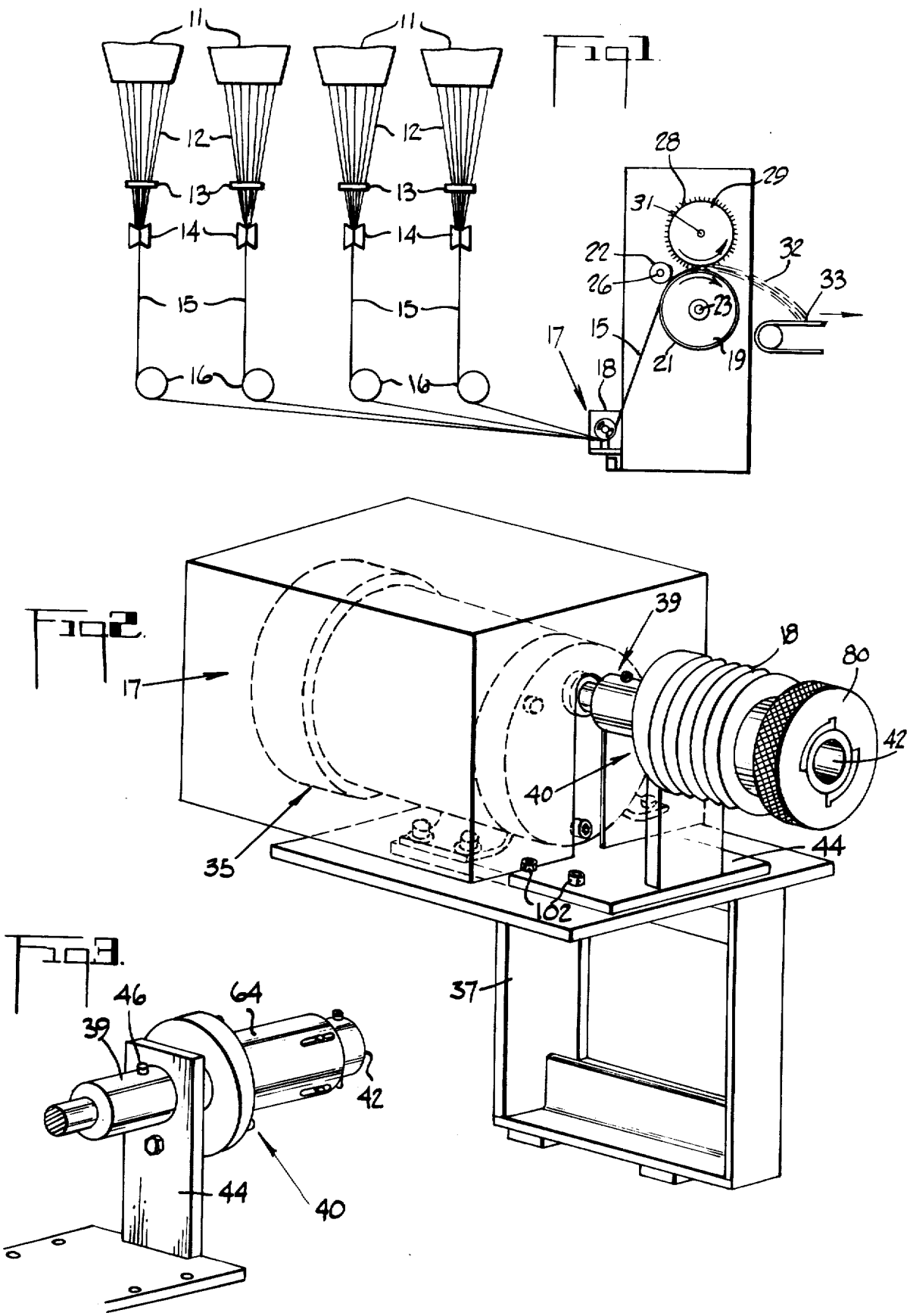

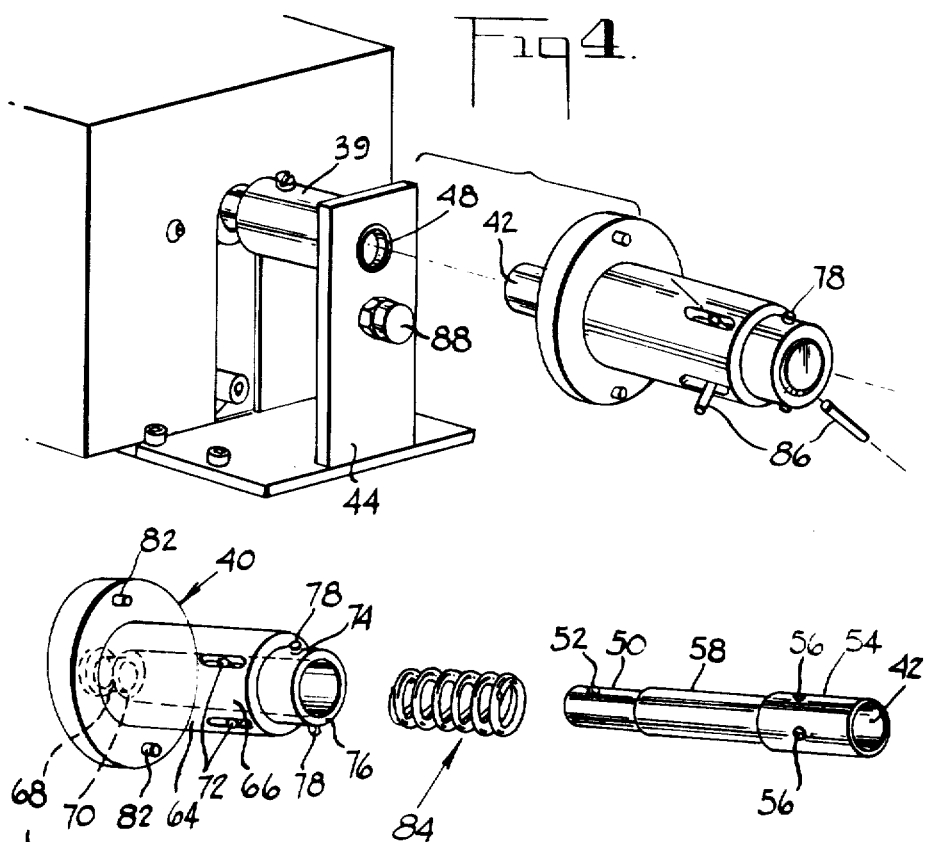
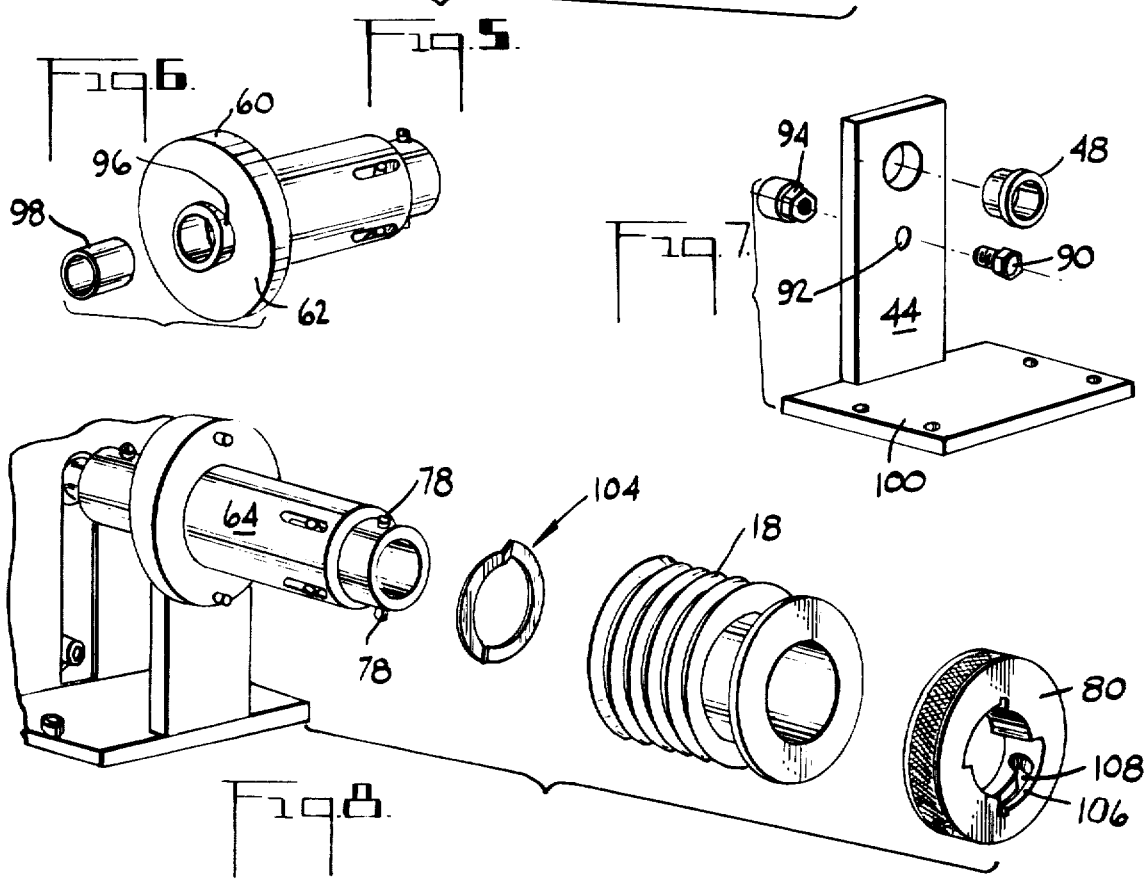

DEVICE FOR OSCILLATING A ROTATING BODY ALONG ITS ROTATIONAL AXIS

BACKGROUND OF THE INVENTION

Frequently, it is desirable to oscillate a rotating body along its rotational axis. For example, it is desirable to so oscillate a rotating pad or guide wheel guiding fibers or fiber strands to a chopper to lengthen the life of the cutting blades and the cot roll on the chopper.

As evidenced by U.S. Pat. Nos. 3,771,701, 3,815,461 and 3,869,268, the devices used to oscillate the pad wheel in the past have been bulky, have required extensive linkage, and have had numerous wear points in the linkage. The environment surrounding a chopper is usually harsh on wear points. The area is usually wet from water mist sprays in the area. Sizes and lubricants from the fibers are also present as well as short fibers and fragments of fibers.

Thus, it would be desirable to have a simpler device for oscillating the pad wheel, i.e. one having fewer wear points and whose wear points are easily and inexpensively replaced. The object of this invention is to provide a compact device having such features.

BRIEF SUMMARY OF THE INVENTION

The present invention provides a device for oscillating a rotating body along its rotational axis, the device being adaptable to being coupled to a rotatable shaft, comprising (a) means for supporting the body, (b) means for biasing the supporting means in a first direction along the rotational axis, (c) cam means and cam follower means cooperating with one another during rotation of the cam means for periodically moving the supporting means in a second direction opposite the first direction, and (d) means for interlocking the supporting means, the cam means, and the body such that when any one of these members is rotated, the other two members are also rotated therewith.

More particularly, the present invention provides a device for oscillating a rotating body along its rotational axis comprising (a) a shaft having three longitudinal portions, each portion having a different diameter, a first portion having the smallest diameter being an end portion and being adapted to being coupled to a rotatable shaft, a second portion having the largest diameter and being located at the opposite end portion of the shaft from said first portion, said second portion having radial holes therein, and a third portion extending between the first and second portion and having a diameter intermediate that of the first and second portions, (b) a cam assembly comprising a cam having a cam surface generally perpendicular to the rotational axis and facing away from the rotating body, a longitudinal support for the body rigidly attached to the cam, the support and cam having an axis coinciding with said rotational axis and having a bore therethrough whose center line coincides with said rotational axis to receive the second and third portions of the shaft, the support having slots extending longitudinally for a portion of the length of the support in the portion of the support opposite the cam end and extending from the outside of the support to the bore, the slots aligning with the radial holes in the shaft when the shaft is in place in the cam assembly, the support having a shoulder in the bore close to the cam end of the support, and means for causing the body to rotate when the cam and support are rotated, (c) pins extending from the radial holes in the shaft into the slots in the support, (d) spring means located around the shaft and extending between the shoulder in the bore of the support and the shoulder formed at the junction of the third and second portions of the shaft for biasing the cam towards a cam follower opposite the face of the cam, and (e) guide means having a hole therethrough for allowing the passage of the first portion of the shaft and having a cam follower spaced from the hole which cooperates with the cam and the spring means on the rotation of the cam to cause support end body to oscillate along the rotational axis of the body.

The apparatus of the present invention is particularly suited for use on a fiber or fiber strand chopper of the type described above. Preferably, the cam follower in the present invention is made of an inexpensive material which is softer than the cam. With such a combination what wear there is exists mainly in the cam follower which can be easily and inexpensively replaced.

BRIEF DESCRIPTION OF THE DRAWINGS

FIG. 1 is an elevational view of a system for making chopped glass fiber using the apparatus of the present invention.

FIG. 2 is a perspective view of a portion of the system shown in FIG. 1 and including an apparatus according to the present invention.

FIG. 3 is a perspective view of a portion of that apparatus shown in FIG. 2 including an apparatus according to the present invention.

FIG. 4 is another perspective view of an apparatus according to the present invention partially disassembled.

FIG. 5 is an exploded view in perspective of a cam assembly mechanism, a spring, and a shaft of a device embodying the invention.

FIG. 6 is a perspective view of the cam assembly mechanism and bushing.

FIG. 7 is an exploded view in perspective of an axle support bushing, a guide means with its base member, a swivel pad, and a swivel pad bolt.

FIG. 8 is an exploded view in perspective showing the elements illustrated in FIGS. 6 and 7 in their assembled configuration, a wave spring washer, a rotatable pad wheel and a pad wheel lock.

DETAILED DESCRIPTION AND PREFERRED EMBODIMENTS

Figure 9:
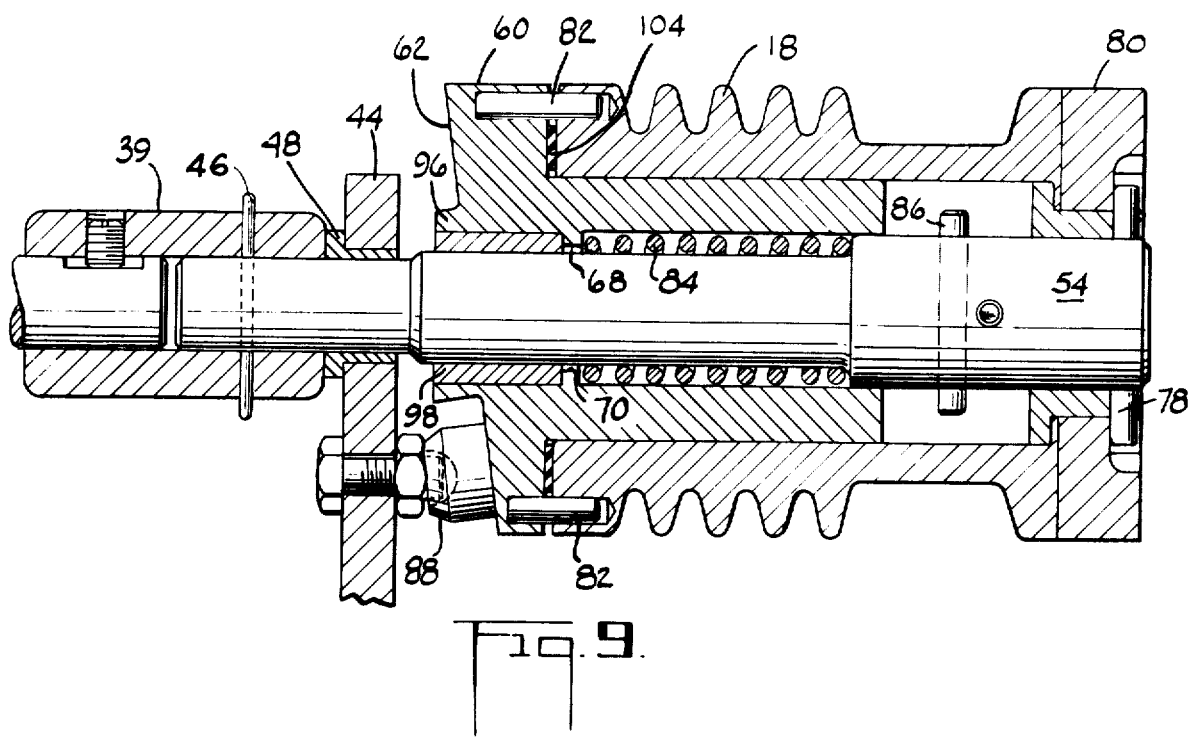
FIG. 9 is a partial cross section parallel to and through its rotational axis.

As mentioned above, the apparatus according to the present invention is particularly suited to a system for making chopped fiber. Referring to FIG. 1, such a system is shown incorporating the apparatus of the present invention. FIG. 1 is an elevational view of a system used to make chopped glass fiber as disclosed in U.S. Pat. No. 3,815,461, the disclosure of which is herein incorporated by reference. As shown in FIG. 1, a plurality of fiber forming bushings 11 issue filaments 12 of molten glass which are drawn over or past a size or lubricant applicator 13 to a gathering wheel 14 which forms strands 15. These strands are guided by guide wheel 16 to a rotating oscillating pad wheel 18 of the present invention which is being driven by a conventional gear motor drive means 17. From the pad wheel 18 the strands 15 are carried over a backup roll 19 which can be coated with a layer of urethane 21 to enhance the frictional forces between the strands 15 and the roll 19.

Further enhancement of the filament pulling force developed at roll 19 is achieved by pressure roll 22 which forces the strands 15 against the roll 19. The roll 19 is mounted on a shaft 23 and the roll 22 is mounted on a shaft 26. The strands 15 are chopped as they are carried by the roll 19 into a region at the upper face of the roll engaged by blades 28 mounted to protrude radially from a blade roll 29. Shaft 31 supports the blade roll 29. The resultant chopped materials 32 is thrown by the force of the roller 19 and the chopper blade 28 away from the chopper and onto a conveyor 33 which conveys the material to a desired location.

If the pad wheel 18 is not oscillated along its axis of rotation, the fiber strands 15 will tend to wear grooves in the urethane coating 21 and in the blades 28 resulting in an undesirably short life for both. When the pad wheel 18 is oscillated along its axis of rotation, this oscillation causes the fiber strands 15 to move back and forth over almost the entire width of the cutter blades 28 and the corresponding width on the backup roll surface 21. This moving of the strands back and forth continuously distributes the wear evenly over the blades and the urethane surface and maximizes the life of both the blades 28 and the urethane surface 21.

FIG. 2 is an enlarged view of the oscillating pad wheel 18 and the conventional drive 17. The drive 17 comprises a conventional gear motor 35 having a shaft output speed typically of less than 20 RPMs preferably less than 10 RPMs, and most preferably less than 5 RPMs such as about 2 RPMs. The gear motor drive 35 is attached to a mounting assembly 37 in the conventional manner. The drive 17 also comprises a conventional coupling member 39 for coupling the shaft of the gear motor to a shaft of the oscillating device of the present invention. The pad wheel 18 is caused to oscillate along its rotational axis by the device of the present invention which comprises a cam assembly 40, a shaft 42, and a guide means 44.

FIG. 3 shows a device according to the present invention with the rotating body or pad wheel removed. The shaft 42 extends through the cam assembly 40 and through the guide means 44 and into the coupling member 39 where it is rigidly attached thereto by a pin 46. The axle 42 is supported by the guide means 44 in a self-lubricating bushing 48 as seen in FIGS. 4 and 7.

As shown in FIG. 5, the shaft 42 has three longitudinal portions, each having a different diameter. A first portion 50 has the smallest diameter for passing through the bushing 48 and into the coupling member 39. The portion 50 has a hole 52 in its end portion for receiving the pin 46 in the coupling member. The shaft 42 has a second portion 54 located at the opposite end of the first portion 50 having the largest diameter and having radial holes 56 extending therethrough. A third portion 58 extends between the first portion 50 and the second portion 54 and has a diameter intermediate that of the first and second portions. The cam assembly mechanism 40 comprises a cam 60. The cam 60 has a cam surface 62, see FIG. 6, which is generally perpendicular to the rotational axis of the cam 60 and the shaft 42. Of course, the configuration of the cam surface 62 will vary depending upon the number of oscillations desired per revolution of the cam 60. The cam surface 62 shown in FIGS. 6 and 9 are designed to provide one cycle of oscillation per revolution of the cam 60. The oscillating cam mechanism 40 also comprises a support 64 for a rotatable body, such as the pad wheel 18. Preferably the support 64 and the cam 60 are either a single piece or are rigidly connected by any suitable means.

The support member 64 has a bore 66 whose axis coincides with the rotational axis of the support and whose diameter is sufficient to permit the large portion 54 of the shaft 42 to pass through without binding. At a point close to the cam end of the support 64, the bore is of a reduced diameter 68, sufficient to enable passage of the intermediate portion 58 of the shaft 42 to pass without binding, forming a shoulder 70 (see FIG. 9) inside the support 64. The support 64 also has a plurality of longitudinal slots 72 extending for a portion of the length of the support in the portion of the support opposite the cam end and extending from the outside of the support to the bore 66. The slots 72 are so located to align with the radial holes 56 in the large portion 54 of the shaft 42 when the shaft 42 is inserted into the support 64.

The support 64, in the preferred embodiment illustrated, has an integral extension member 74 rigidly attached to the end of the support 64 opposite the cam end. The outer diameter of the extension member 74 is less than the outer diameter of the support 64. Extension member 74 has a bore 76 in alignment with the bore 66 in the support 64. Extension member 74 also has two pins 78 which extend into the member 74 but not into the bore 76. The pins 78 cooperate with a locking member 80 (see FIG. 2) for holding the pad wheel in place on the support 64. One or more pins 82 on the cam 60 opposite the cam surface 62 fit into aligned holes in the end of the pad wheel 18 such that rotation of the cam 60 or the support member 64 will also rotate the pad wheel 18. Any suitable engaging mechanism can be used in place of the pins 82.

A spring 84 having an interior diameter sufficiently large to allow the intermediate portion 58 of the shaft 42 to pass therethrough without binding is placed over the shaft 42 which is inserted into the spring until one end of the spring come to rest against the shoulder between the intermediate portion 58 and the large portion 54 of the shaft. The shaft and spring assembly is then inserted into the bore 66 of the support member 64, the smallest portion 50 of the shaft passing entirely through the cam assembly 40 and through the self-lubricating bushing 48 of the guide means 44 and into the coupling member 39 where it is rigidly attached thereto by a pin 46. The spring 84 is compressed between the shoulder formed at the juncture of the large and intermediate portions of the shaft and the shoulder 70 of the support member 64 causing the support member to be biased in the direction of the guide means 44 and causing the cam surface 62 to bear against the cam follower 88. The shaft is then rotated relative to the support member 64 until the radial holes 56 of the shaft are aligned with the slots 72 of the support member. Referring to FIG. 4, pins 86 are then inserted through the slot 72 and into the radial holes 56. The pins 86 should be of sufficient length to extend completely through the holes 56 and partway into opposite slots 72.

Referring to FIG. 4, the guide means carries a cam follower 88 on the surface facing the cam surface 62. As has been shown in FIG. 7, the cam follower 88 comprises a bolt 90 extending through a hole 92 in the guide means and threaded into a swivel pad 94. The hole 94 could be enlarged to a vertical slot to permit adjustment of the swivel pad 94 and thus the magnitude of oscillation of member 18. The swivel pad 94 can swivel approximately 10° in any direction and bears against the cam face 62 at all times. Preferably, the cam 60 is made of a material substantially harder than the swivel pad 94 such that a major portion of the wear between the pad and the swivel pad is concentrated in the swivel pad 94 which can be replaced quickly and inexpensively. A metal cam and a nylon pad is a suitable combination.

Referring to FIG. 6, the cam 60 has a sleeve 96 bored sufficiently large in diameter to snugly receive a bushing 98 whose interior diameter is sufficient to allow the intermediate portion of the shaft 58 to pass therethrough without binding. The purpose of the bushing 98 is to permit the cam 60 to move axially with respect to the shaft 42 with a minimum of friction and wear.

The guide means 44 has a base member 100 which can be rigidly mounted to the mounting member 37 by a bolts 102 (see FIG. 2). When the device of the present invention is fully assembled and connected to the coupling member 39 as shown in FIG. 3, the device is ready to receive a rotating body, such as the pad wheel 18. Any suitable means of attaching the rotating body or pad wheel 18 to the support member 64 can be used. In the preferred embodiment illustrated here, a wave spring washer 104 or any suitable equivalent, is first inserted over the support 64 and against the cam 60. The pad wheel 18 is then inserted over the support surface 64 followed by the pad wheel lock 80. The interior of the pad wheel lock has two slots 106, the openings of which align with the pins 78. The pad wheel lock is aligned to permit the pin 78 to enter the slots 106 and the pad wheel lock is then pressed against the pad wheel sufficiently hard to compress the wave spring washer 104 against the cam 60. The pad wheel lock is then rotated to cause the pin 78 to follow the slot 106 to its terminal point 108 which locks the pad wheel on to the device. Any other suitable mechanism for holding the pad wheel 18 onto the support 64 would be suitable.

In the preferred embodiment, the cam 60, the support 64, and the extension member 78 are a single piece made by casting or by milling from a solid piece of stock. This is not critical as the pieces could be made separately and then rigidly joined together. The extended member 78 is not essential to the invention and could be eliminated by using well known locking means that would cooperate with the support 64 and the pad wheel 18.

Although the device illustrated shows the cam 60 rotating with the body 18, alternatively a cam surface like surface 62 could be fixed onto the guide means 44 and a cam follower like follower 88 could be fixed to a flange or an ear rigidly attached to the end of support 64.

In describing the invention, certain embodiments have been used to illustrate the invention and the practice thereof. However, the invention is not limited to these specific embodiments as other embodiments and modifications within the spirit of the invention will readily occur to those skilled in the art on reading this specification. The invention is thus not intended to be limited to the specific embodiments disclosed, but instead is to be limited only by the claims attended hereto.

What we claim is:

1. A device for oscillating a rotating body along its rotational axis comprising:
    a. a shaft having three longitudinal portions each having a different diameter, a first portion having the smallest diameter being an end portion and being adapted to being coupled to a rotational shaft, a second portion being located at the opposite end portion of the shaft having the largest diameter and having radial holes therein, and a third portion extending between said first and said second portions and having a diameter intermediate that of said first and second portions,
    b. a cam assembly comprising a cam having a cam surface generally perpendicular to said rotational axis and facing away from the rotating body, a longitudinal support for said body rigidly attached to said cam, said support and cam having an axis coinciding with said rotational axis and having a bore therethrough whose centerline coincides with said rotational axis to receive the second and third portions of said shaft, said support having slots extending longitudinally for a portion of the length of said support in a portion of the support opposite said cam end and extending from the outside of the support to said bore, said slots aligning with said radial holes in said shaft when said shaft is in place in said cam assembly, said support having a shoulder in said bore close to the cam end of the support, and means for causing said body to rotate when said cam and support are rotated,
    c. pins extending from said radial holes in said shaft into said slots in said support,
    d. spring means located around said shaft and extending between said shoulder in the bore of said support and the shoulder formed at the junction of third and second portions of said shaft in biasing said cams towards a cam follower, and
    e. guide means having a hole therethrough for allowing the passage of the first portion of said shaft and having a cam follower spaced from said hole which cooperates with said cam and said spring means upon the rotation of said cam to cause said support and body to oscillate along the rotational axis of said body.

2. A device for oscillating a rotating body along its rotational axis comprising:
    a. a shaft having three longitudinal portions each having a different diameter, a first portion having the smallest diameter being an end portion and being adapted to being coupled to a rotational shaft, a second portion being located at the opposite end portion of the shaft having the largest diameter, and a third portion extending between said first and said second portions and having a diameter intermediate that of said first and second portions,
    b. a cam assembly commprising a cam having a cam surface generally perpendicular to said rotational axis and facing away from the rotating body, a longitudinal support for said body rigidly attached to said cam, said support and cam having an axis coinciding with said rotational axis and having a bore therethrough whose centerline coincides with said rotational axis to receive the second and third portions of said shaft, cooperating means on the second portion of said shaft and said support for transmitting torque to said support and for providing for axial movement of said support relative to said shaft, said support having a shoulder in said bore close to the cam end of said support, and means for causing said body to rotate when said cam and support are rotated,
    c. a cam follower and means maintaining said follower in fixed position slidably engaging said cam surface; and d. spring means located around said shaft and extending between said shoulder in the bore of said support and the shoulder formed at the junction of third and second portions of said shaft in biasing said cam surface towards said cam follower, said spring means being enclosed within a substantially closed chamber defined by the surfaces of said shoulder in the bore of said support, the shoulder formed at the junction of third and second portion of said shaft, and substantial portions of the third portion of said shaft and the bore of said support.

* * * * *